G. L. MORRIS.

NICKING SCREW HEADS.

No. 2,443. Reissued Jan. 1, 1867.

Witnesses,
Samuel A. Piper
George Andrews.

Inventor,
George L. Morris.
By his attorney,
R. H. Eddy

THE NORRIS PETERS CO., PHOTO-LITHO., WASHINGTON, D. C.

United States Patent Office.

GEORGE L. MORRIS, OF TAUNTON, MASSACHUSETTS.

*Letters Patent No.* 55,524, *dated June* 12, 1866; *reissue No.* 2,443, *dated January* 1, 1867.

IMPROVEMENT IN NICKING SCREW-HEADS.

The Schedule referred to in these Letters Patent and making part of the same.

TO ALL WHOM IT MAY CONCERN:

Be it known that I, GEORGE L. MORRIS, of Taunton, in the Commonwealth of Massachusetts, have invented a new and useful improvement in Screws; and I hereby declare the following to be a full, clear, and exact description thereof, which will enable others to make and use my invention, reference being had to the accompanying drawings, forming part of this specification, in which—

Same letters indicate like parts.

Figure 1:
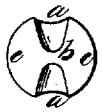
Figure 1 is a top view.
Figure 2:
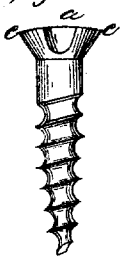
Figure 2 is a side elevation of a wood screw made in accordance with my invention.

My invention has reference to the formation of the head of a screw with two nicks for the reception of the end of the screw-driver, for the purpose of turning the screw and inserting it into or withdrawing it from any substance. In the common method of nicking a screw-head, the nick is made to extend entirely across the screw-head diametrically thereof. In proportion as this nick is made deep, so is increased the liability of the head or part thereof being twisted or broken off by the screw-driver when the screw is being turned thereby after being inserted into any substance where some force is necessary to turn the screw. By my invention the nicks can be made as deep as the head of the screw is thick, or nearly so, if it is desired, and at the same time be made of sufficient strength to endure without injury any common necessary strain.

In carrying out my improvement, I form two nicks on the top of the head of the screw, so that they will have an interval or separating bar between them, the two nicks being made in the same diametrical line across the screw-head. From the formation of the nicks it can be seen that they necessitate the use of a driver, with a fulcrated end to fit into the nicks. As is well known, the single nick of the ordinary screw divides the head thereof into two portions, which forbids the nick or channel being made to any considerable depth into the screw-head, as the two parts thereof are by the channel wholly separated. With my invention, where the cross-bar or separating part acts as a strengthening connection between the two parts of the head, the nicks can be increased in depth, and thus give a better holding place for the end of the screw-driver, and prevent its being thrown out when being used, as is frequently the case with an ordinary driver when used with the common screw. If the width, or depth, or both, of the nicks are increased, the strength of the head can be preserved undiminished by widening in the same proportion the cross-bar between the nicks, and the strength of the driver maintained by simply fitting its two ends to the size of the nicks. The nicks can also be made flaring, or wider at their outer than at their inner ends, and then, by accommodating the driver to this shape, it is provided against liability to fracture by thus being strengthened. The object of the two nicks is, as thus indicated, to provide a better holding place for the end of the screw-driver in the screw-head, and the cross-piece is employed to strengthen the head, as the two nicks can thus be made to a greater depth into the head than with the common single nick or channel. Two nicks on the line of one and the same diameter of the screw-head cannot be made without leaving a space between them, but if the two nicks were placed in any other position than in a right line, (as, for instance, so as to form an obtuse, a right, or less than a right angle with each other on the screw-head,) then the position of the separating part would be, in relation to the two nicks, quite different, could not be made to subserve the same purpose, to wit, to strengthen the head; and, indeed, by such an arrangement of the nicks, the strength of the head would be much diminished. Such arrangement, of course, I do not claim.

My improved screw is manufactured of the materials common for such purpose, by casting the same in moulds prepared for the purpose, and with the head of the screw having the two nicks on a line of one and the same diameter, with the cross-bar or separating part between them, or by cutting as the common single nick is made.

In the accompanying drawings, *a* shows the nicks, *b* the cross-bar or separating part between the nicks, and *c* the remaining portions of the screw-head.

What I claim as my invention, and desire to secure by Letters Patent, is—

The improved two-nicked screw, made either by casting or cutting, having the said nicks flaring at their outer ends, and with the separating part between strengthening the head, the two nicks being made on the line of one and the same diameter of the screw-head, all as and for the purposes specified.

GEO. L. MORRIS.

Witnesses:

FREDERICK CRANE,
JAMES H. DEAN.